(12) United States Patent
Kim et al.

(10) Patent No.: US 11,565,938 B2
(45) Date of Patent: Jan. 31, 2023

(54) CARBON NANOTUBE COMPOSITION AND METHOD OF PREPARING THE SAME

(71) Applicant: LG CHEM, LTD., Seoul (KR)

(72) Inventors: Sung Jin Kim, Daejeon (KR); Jae Keun Yoon, Daejeon (KR); Dong Hyun Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 294 days.

(21) Appl. No.: 16/624,743

(22) PCT Filed: Nov. 27, 2018

(86) PCT No.: PCT/KR2018/014740
§ 371 (c)(1),
(2) Date: Dec. 19, 2019

(87) PCT Pub. No.: WO2019/132266
PCT Pub. Date: Jul. 4, 2019

(65) Prior Publication Data
US 2021/0276871 A1    Sep. 9, 2021

(30) Foreign Application Priority Data

Dec. 26, 2017 (KR) .................. 10-2017-0179769
Nov. 26, 2018 (KR) .................. 10-2018-0146926

(51) Int. Cl.
| | | |
|---|---|---|
| *C01B 32/162* | (2017.01) |
| *B82Y 40/00* | (2011.01) |
| *B01J 21/04* | (2006.01) |
| *B01J 23/847* | (2006.01) |
| *B01J 37/02* | (2006.01) |
| *B01J 37/04* | (2006.01) |
| *B01J 37/08* | (2006.01) |
| *B82Y 30/00* | (2011.01) |

(52) U.S. Cl.
CPC ............ *C01B 32/162* (2017.08); *B01J 21/04* (2013.01); *B01J 23/8472* (2013.01); *B01J 37/0217* (2013.01); *B01J 37/0221* (2013.01); *B01J 37/04* (2013.01); *B01J 37/08* (2013.01); *B82Y 30/00* (2013.01); *B82Y 40/00* (2013.01); *C01B 2202/22* (2013.01); *C01B 2202/26* (2013.01); *C01B 2202/32* (2013.01); *C01B 2202/36* (2013.01); *C01P 2002/70* (2013.01); *C01P 2002/78* (2013.01); *C01P 2004/50* (2013.01); *C01P 2006/11* (2013.01)

(58) Field of Classification Search
CPC . C01B 32/174; C01B 32/168; C01B 2202/26; C01P 2004/03; C01P 2004/13
See application file for complete search history.

(56) References Cited

U.S. PATENT DOCUMENTS

| | | |
|---|---|---|
| 2015/0273441 A1 | 10/2015 | Kim et al. |
| 2015/0274529 A1 | 10/2015 | Kim et al. |
| 2015/0298974 A1 | 10/2015 | Kim et al. |
| 2016/0214863 A1 | 7/2016 | Kim et al. |
| 2018/0175439 A1 | 6/2018 | Kang et al. |
| 2018/0269485 A1 | 9/2018 | Sik et al. |
| 2019/0044150 A1 | 2/2019 | Kim et al. |

FOREIGN PATENT DOCUMENTS

| | | |
|---|---|---|
| CN | 102002652 B | 6/2012 |
| CN | 104870363 A | 8/2015 |
| EP | 3053878 A1 | 8/2016 |
| JP | 2011148674 A | 8/2011 |
| KR | 10-20150007266 A | 1/2015 |
| KR | 1020150007267 A | 1/2015 |
| KR | 10-20150027675 A | 3/2015 |
| KR | 10-20150037601 A | 4/2015 |
| KR | 10-20150037661 A | 4/2015 |
| KR | 10-20150142408 A | 12/2015 |
| KR | 10-20170011834 A | 2/2017 |
| KR | 10-20170031061 A | 3/2017 |
| KR | 10-20170037454 A | 4/2017 |
| KR | 10-20170037458 A | 4/2017 |
| KR | 1020170113250 A | 10/2017 |

*Primary Examiner* — Richard M Rump
(74) *Attorney, Agent, or Firm* — Dentons US LLP

(57) ABSTRACT

The present invention relates to a carbon nanotube composition including entangled-type carbon nanotubes and bundle-type carbon nanotubes, wherein the carbon nanotube composition has a specific surface area of 190 $m^2/g$ to 240 $m^2/g$ and a ratio of specific surface area to bulk density of 0.1 to 5.29.

6 Claims, No Drawings

CARBON NANOTUBE COMPOSITION AND METHOD OF PREPARING THE SAME

The present application is a National Phase entry of PCT/KR2018/014740 filed on Nov. 27, 2018, and claims priority to and the benefit of Korean Patent Application Nos. 10-2017-0179769, filed on Dec. 26, 2017, and 10-2018-0146926, filed on Nov. 26, 2018, the disclosures of which are incorporated herein by reference in their entirety.

FIELD

The present invention relates to a carbon nanotube composition and a method of preparing the carbon nanotube composition, and more particularly, to a carbon nanotube composition exhibiting enhanced dispersibility and enhanced conductivity by adjusting a ratio of a specific surface area to a bulk density.

BACKGROUND

Carbon nanotubes, which are a type of fine carbon fibers, are tubular carbon having an average diameter of 1 μm or less, and are expected to be applied to various fields due to their high conductivity, tensile strength, and heat resistance derived from their unique structures. However, despite the availability of such carbon nanotubes, carbon nanotubes have limitations in usage due to their low solubility and dispersibility. Thus, a conductive material dispersion prepared by pre-dispersing carbon nanotubes in a dispersion medium has been used. However, carbon nanotubes are unable to form a stably dispersed state in a dispersion medium and are agglomerated due to strong Van der Waals interactions.

To address these problems, various attempts have been made. Specifically, methods of dispersing carbon nanotubes in a dispersion medium through mechanical dispersion treatment such as ultrasonic treatment, or the like have been proposed. However, when these methods are used, excellent dispersibility is obtained during irradiation of ultrasonic waves, but carbon nanotubes start to agglomerate with each other when ultrasonic irradiation is completed. In addition, methods of stably dispersing carbon nanotubes using a variety of dispersants have been proposed. However, these methods also have a problem such as difficulty in handling due to an increase in viscosity when carbon nanotubes are dispersed in a dispersion medium at a high concentration.

Therefore, there is a need to develop carbon nanotubes with enhanced dispersibility without a reduction in conductivity.

SUMMARY

An object of the present invention is to provide a carbon nanotube composition having excellent dispersibility and excellent conductivity, and a method of preparing the carbon nanotube composition.

To achieve the above-described object of the present invention, the present invention provides a carbon nanotube composition comprising entangled-type carbon nanotubes and bundle-type carbon nanotubes, wherein the carbon nanotube composition has a specific surface area of 190 m$^2$/g to 240 m$^2$/g and satisfies the following Equation 1:

$$0.1 \leq X/Y \leq 5.29 \quad \text{<Equation 1>}$$

wherein, in Equation 1, X is a number representing a specific surface area (units: m$^2$/g) of the carbon nanotube composition, and Y is a number representing a bulk density (units: kg/m$^3$) of the carbon nanotube composition.

The present invention also provides a method of preparing a carbon nanotube composition, comprising: mixing an organic acid and a vanadium precursor in a molar ratio of 1:0.088 to 1:0.605 to prepare a mixture; mixing the mixture and a cobalt precursor to prepare a catalyst precursor; performing first heat treatment on aluminum hydroxide to prepare a support; supporting the catalyst precursor on the support and then performing second heat treatment on the resulting support to prepare a supported catalyst; and reacting the supported catalyst with a carbon-based compound.

A carbon nanotube composition of the present invention can be included in a conductive material dispersion at a high concentration due to its excellent dispersibility and conductivity. In addition, entangled-type carbon nanotubes and bundle-type carbon nanotubes, which are included in the carbon nanotube composition, can be simultaneously prepared, and thus high productivity is achieved.

DETAILED DESCRIPTION

Hereinafter, the present invention will be described in more detail to aid in understanding of the present invention.

The terms or words used in the present specification and claims should not be construed as being limited to ordinary or dictionary meanings and should be construed as meanings and concepts consistent with the spirit of the present invention based on a principle that an inventor can appropriately define concepts of terms to explain his/her invention in the best way.

In the present invention, carbon nanotubes refer to pristine carbon nanotubes that have not undergone separate processing.

In the present invention, entangled-type carbon nanotubes refer to a secondary structural form in which a plurality of carbon nanotube units are entangled with each other without a certain form such as a bundle or a rope.

In the present invention, bundle-type carbon nanotubes refer to the arrangement of a plurality of carbon nanotube units such that longitudinal axes of the units are parallel to each other in substantially the same direction, or a secondary form twisted or entangled into a bundle or rope form after the arrangement.

In the present invention, the carbon nanotube unit has a graphite sheet in the form of a cylinder having a nano-sized diameter, and has a sp$^2$ bonding structure. In this case, the graphite sheet may exhibit characteristics of a conductor or a semiconductor according to the wound angle and structure. The carbon nanotube units may be classified into single-walled carbon nanotubes (SWCNTs), double-walled carbon nanotubes (DWCNTs), and multi-walled carbon nanotubes (MWCNTs) according to the number of bonds forming the walls, and the thinner the walls, the lower the resistance.

In the present invention, a specific surface area of a carbon nanotube composition may be measured by a BET method, and may be calculated from the amount of nitrogen gas adsorbed at a liquid nitrogen temperature (77° K) using, for example, BELSORP-mino II manufactured by BEL Japan.

In the present invention, the bulk density of carbon nanotubes may be measured in accordance with ASTM B329, particularly ASTM B329-06. In addition, the bulk density may be measured using a Scott volumeter (Version USP 616).

In the present invention, the bulk density of the carbon nanotube composition may be measured in accordance with laboratory conditions, and substantially the same results as those based on the above-described stipulation may be obtained.

For measurement of the bulk density in a laboratory, a 5 ml cylinder (manufacturer: DURAN, material: glass) or a 32 ml stainless container (manufacturer: SCOTT) is placed on a scale, the scale is calibrated to 0, a carbon nanotube composition is added to the cylinder or the stainless container, the volume of the carbon nanotube composition is measured by reading the scale after adjusting the eye level to the height of the carbon nanotube composition, the carbon nanotube composition is weighed, and then the bulk density of the carbon nanotube composition may be calculated by the following Equation:

Bulk density (kg/m$^3$)=weight (kg) of carbon nanotube/volume (m$^3$) of carbon nanotube In the present invention, the average diameter and average length of the carbon nanotube units may be measured using a field emission scanning electrode microscope.

1. Carbon Nanotube Composition

A carbon nanotube composition according to an embodiment of the present invention includes entangled-type carbon nanotubes and bundle-type carbon nanotubes, wherein the carbon nanotube composition has a specific surface area of 190 m$^2$/g to 240 m$^2$/g and satisfies the following Equation 1:

$$0.1 \leq X/Y \leq 5.29 \qquad \text{<Equation 1>}$$

wherein, in Equation 1, X is a number representing a specific surface area (units: m$^2$/g) of the carbon nanotube composition, and Y is a number representing a bulk density (units: kg/m$^3$) of the carbon nanotube composition.

The carbon nanotube composition has a specific surface area of 190 m$^2$/g to 240 m$^2$/g. The specific surface area of the carbon nanotube composition may be 193 m$^2$/g to 239 m$^2$/g, 195 m$^2$/g to 239 m$^2$/g, 200 m$^2$/g to 238 m$^2$/g, or 200 m$^2$/g to 235 m$^2$/g, and preferably 200 m$^2$/g to 235 m$^2$/g. When the specific surface area of the carbon nanotube composition has the above-described specific surface area, the carbon nanotube composition may have excellent conductivity and may be suitable for a high-concentration dispersion. When the specific surface area of the carbon nanotube composition is less than the above-described value, conductivity is significantly reduced, and when the specific surface area of the carbon nanotube composition exceeds the above-described value, it is impossible for the carbon nanotube composition to be dispersed in a conductive material dispersion at a high concentration.

Equation 1 is an index representing a dispersion concentration when a conductive material dispersion is prepared using the carbon nanotube composition, and the value of Equation 1 is 0.1 to 5.29. The value of Equation 1 is 1 to 5.14, 1.5 to 5, or 1.7 to 2.5, and preferably, 1.7 to 2.5. When Equation 1 has above-described value, carbon nanotubes may be dispersed in a conductive material at a higher concentration. When the value of Equation 1 is less than the above-described value, the diameters of the carbon nanotube units significantly increase, and thus it is difficult to apply the carbon nanotube dispersion as a conductive material. When the value of Equation 1 exceeds the above-described value, it is difficult for the carbon nanotube dispersion to be dispersed in a conductive material dispersion at a high concentration.

The carbon nanotube composition may have a bulk density of 25 kg/m$^3$ to 150 kg/m$^3$, 35 kg/m$^3$ to 130 kg/m$^3$, 40 kg/m$^3$ to 125 kg/m$^3$, 50 kg/m$^3$ to 125 kg/m$^3$, or 90 kg/m$^3$ to 115 kg/m$^3$, preferably 90 kg/m$^3$ to 115 kg/m$^3$. When the bulk density of the carbon nanotube composition has above-described value, the carbon nanotube composition may have sufficient particle properties, and thus may be slowly dispersed in a conductive material dispersion preparation process, thus enabling dispersion at a high concentration.

The carbon nanotube composition may include the entangled-type carbon nanotubes and the bundle-type carbon nanotubes in a weight ratio of 1:0.01 to 1:0.5, preferably 1:0.02 to 1:0.3, and more preferably 1:0.05 to 1:0.2. When the weight ratio of the entangled-type carbon nanotubes and the bundle-type carbon nanotubes has the above-described value, excellent conductivity is obtained.

In the carbon nanotube composition, the carbon nanotube units may have an average diameter of preferably 30 nm or less, more preferably 10 nm to 30 nm. When the average diameter of the carbon nanotube units has the above-described value, dispersibility and conductivity may be enhanced. The carbon nanotube units may have an average length of preferably 0.5 μm to 200 μm, more preferably 10 μm to 60 μm. When the average length of the carbon nanotube units has the above-described value, carbon nanotube units exhibit excellent electrical conductivity and excellent strength, and are stable both at room temperature and a high temperature.

The carbon nanotube units may have an aspect ratio of preferably 5 to 50,000, more preferably 10 to 20,000, wherein the aspect ratio is defined as a ratio of the length (the length of a major axis passing through the center of the unit) of the carbon nanotube unit to the diameter (the length of a minor axis passing through the center of the unit and perpendicular to the major axis) of the carbon nanotube unit.

The carbon nanotube units have an interlayer distance (don) obtained by X-ray diffraction of a carbon crystal of 0.335 nm to 0.342 nm, may satisfy the following condition: interlayer distance ($d_{002}$)<0.3448-0.0028 (log φ), wherein φ is an average diameter of the carbon nanotube units, and may have a thickness (Lc) in a C-axis direction of the crystal of 40 nm or less. The interlayer distance ($d_{002}$) may preferably be less than 0.3444-0.0028 (log φ), more preferably less than 0.3441-0.0028 (log φ). When the interlayer distance (don) has the above-described value, the carbon nanotube units may exhibit enhanced crystallinity, and entangled-type carbon nanotubes including the carbon nanotube units may exhibit further enhanced conductivity.

2. Method of Preparing Carbon Nanotube Composition

A carbon nanotube composition according to an embodiment of the present invention is prepared using a method including: 1) mixing an organic acid and a vanadium precursor in a molar ratio of 1:0.088 to 1:0.605 to prepare a mixture; 2) mixing the mixture and a cobalt precursor to prepare a catalyst precursor; 3) performing first heat treatment on aluminum hydroxide to prepare a support; 4) supporting the catalyst precursor on the support and performing second heat treatment on the resulting support to prepare a supported catalyst; and 5) reacting the supported catalyst with a carbon-based compound.

Hereinafter, each process of the method of preparing a carbon nanotube composition according to an embodiment of the present invention will be described in more detail.

1) Preparation of Mixture

First, an organic acid and a vanadium precursor are mixed in a molar ratio of 1:0.088 to 1:0.605 to prepare a mixture.

The organic acid and the vanadium precursor may be mixed in a molar ratio of 1:0.09 to 1:0.6. When the mixing molar ratio has the above-described value, a carbon nanotube composition dispersible in a conductive material at a high concentration may be prepared. In addition, a carbon nanotube composition including entangled-type carbon nanotubes having a low bulk density and bundle-type carbon nanotubes having a high bulk density may be prepared. When the mixing molar ratio is less than the above-described value, bundle-type carbon nanotubes are not prepared and only entangled-type carbon nanotubes are prepared. When the mixing molar ratio exceeds the above-described range, bundle-type carbon nanotubes are prepared, or it is difficult for the carbon nanotube composition to be dispersed at a high concentration due to its reduced bulk density.

The organic acid may be one or more selected from the group consisting of citric acid, tartaric acid, fumaric acid, malic acid, acetic acid, butyric acid, palmitic acid, and oxalic acid, and among these organic acids, citric acid is preferably used.

The vanadium precursor may be a salt of a vanadium compound, and preferably may be one or more selected from the group consisting of $NH_4VO_3$, $NaVO_3$, $V_2O_5$, and $V(C_5H_7O_2)_3$, and among them, $NH_4VO_3$ is more preferably used.

2) Preparation of Catalyst Precursor

Subsequently, the mixture is mixed with a cobalt precursor to prepare a catalyst precursor.

The mixture and the cobalt precursor may be mixed such that a molar ratio of vanadium and cobalt becomes 1:1 to 1:100, preferably 1:5 to 1:20. When the mixing molar ratio has the above-described value, yield is increased.

The cobalt precursor may be a salt of a cobalt compound, and preferably may be one or more selected from the group consisting of $Co(NO_3)_2 \cdot 6H_2O$, $CoCl_2 \cdot 6H_2O$, $Co_2(CO)_8$, and $[Co_2(CO)_6(t\text{-}BuC\!=\!CH)]$, and among them, $Co(NO_3)_2 \cdot 6H_2O$ is more preferably used.

The mixture and the cobalt precursor, i.e., the organic acid, the vanadium precursor, and the cobalt precursor, may be used in the form of a solution in which they are dissolved in a solvent, and the solvent may be one or more selected from the group consisting of water, methanol, and ethanol, and among them, water is preferably used.

The concentration of the citric acid, the vanadium precursor, and the cobalt precursor in the solution may be 0.1 g/ml to 3 g/ml, preferably 0.5 g/ml to 2 g/ml, and more preferably 0.7 g/ml to 1.5 g/ml.

3) Preparation of Support Subsequently, aluminum hydroxide ($Al(OH)_3$) is subjected to first heat treatment to prepare a support.

The aluminum hydroxide may be pretreated before the first heat treatment.

The pretreatment process may be performed at a temperature of 50° C. to 150° C. for 1 hour to 24 hours. When the pretreatment process is performed, residual solvent or impurities that may be present on a surface of the aluminum hydroxide may be removed.

The aluminum hydroxide may have an average particle diameter of 20 μm to 200 μm, a porosity of 0.1 cm$^3$/g to 1.0 cm$^3$/g, and a specific surface area of less than 1 m$^2$/g.

The first heat treatment process may be performed at a temperature of 250° C. to 500° C., preferably 400° C. to 500° C. In addition, the first heat treatment process may be performed in an air atmosphere. Under the above-described conditions, a support including AlO(OH) and Al(OH)$_3$, which are obtained by conversion of aluminum hydroxide, in amounts of 30 wt % or more and 70 wt % or less, respectively, particularly 40 wt % or more and 60 wt % or less, respectively, and not including $Al_2O_3$ may be prepared.

The support may further include a metal oxide such as $ZrO_2$, $MgO$, $SiO_2$, or the like.

The shape of the support is not particularly limited, but the support may have a spherical shape or a potato shape. In addition, the support may have a porous structure, a molecular sieve structure, a honeycomb structure, or the like so as to have a relatively large surface area per unit mass or unit volume.

4) Preparation of Supported Catalyst

Subsequently, the catalyst precursor is supported on the support, and then subjected to second heat treatment, thereby preparing a supported catalyst.

The supporting process may be performed by uniformly mixing the support and the catalyst precursor, and then aging the resulting mixture for a certain period of time. The mixing process may be performed by rotation or stirring, particularly at a temperature of 45° C. to 80° C. The aging process may be performed for 3 minutes to 60 minutes.

The catalyst precursor may be further subjected to drying after being supported on the support. The drying process may be performed at a temperature of 60° C. to 200° C. for 4 hours to 16 hours.

The second heat treatment process may be performed at an additional pressure of 0.1 bar to 2 bar or 0.5 bar to 1.5 bar, and is preferably performed at a pressure of 0.5 bar to 1.5 bar. When the second heat treatment process is performed under the above-described pressure condition, the bulk density of the carbon nanotube composition may be more appropriately maintained, thus facilitating dispersion at a high concentration.

Meanwhile, the additional pressure of 0.1 bar to 2 bar during the second heat treatment may be measured as an additionally applied pressure at an internal pressure, i.e., atmospheric pressure, of a container in which the second heat treatment process is performed (hereinafter, referred to as a second heat treatment container). When the internal pressure of the second heat treatment container is increased by the second heat treatment process to more than the above-described value, a lid of the second heat treatment container is partially opened by the internal pressure and a gas in the container may be discharged to the outside. When the internal pressure of the second heat treatment container returns to the above-described value after gas discharge, the lid of the container may be closed again. The second heat treatment process may be performed while repeating the above-described processes.

The second heat treatment process may be performed in an air atmosphere for 1 hour to 6 hours. The second heat treatment process may be performed at a temperature of 500° C. to 800° C., preferably 700° C. to 800° C. When the second heat treatment temperature has the above-described value, a supported catalyst, in which the catalyst precursor is present in a state of being coated on a surface and fine pores of the support, is prepared. In addition, a carbon nanotube composition, which are a final product prepared using the supported catalyst, have a bulk density having the above-described value and satisfy the condition of Equation 1.

5) Reaction Between Supported Catalyst and Carbon-Based Compound

Subsequently, the supported catalyst is reacted with a carbon-based compound.

The reaction between the supported catalyst and a carbon-based compound may be carried out by a chemical vapor synthesis method.

Specifically, the reaction may be performed by feeding the supported catalyst into a horizontal fixed bed reactor or a fluidized bed reactor, and injecting the carbon-based compound in a gaseous state (hereinafter, referred to as "gas-phase"), or the gas-phase carbon-based compound and a mixed gas of a reducing gas (e.g., hydrogen, or the like) and a carrier gas (e.g., nitrogen, or the like) into the reactor at a temperature greater than the thermal decomposition temperature of the carbon-based compound and less than the melting point of the supported catalyst, thereby growing carbon nanotubes using a chemical vapor synthesis method through decomposition of the gas-phase carbon-based compound. Carbon nanotubes prepared by the chemical vapor synthesis method have a crystal growth direction almost parallel to a tube axis and have high crystallinity of a graphite structure in a tube longitudinal direction. As a result, carbon nanotube units have a small diameter, high electrical conductivity, and high strength.

In addition, the carbon nanotube composition may be prepared at a temperature of 500° C. to 800° C., preferably 550° C. to 750° C. The above-described reaction temperature allows for the weight of the carbon nanotube composition to be reduced while the generation of non-crystalline carbon is minimized and a bulk size of produced carbon nanotubes is maintained, and thus dispersibility according to a decrease in bulk density may be further enhanced. As a heat source for the heat treatment process, induction heating, radiation heat, a laser, IR, microwaves, plasma, surface plasmon heating, or the like may be used.

In addition, carbon may be supplied as the carbon-based compound, and the carbon-based compound is not particularly limited as long as it can be present in a gaseous state at a temperature of 300° C. or more.

The carbon-based compound may be a carbon-based compound having 6 carbon atoms, and preferably may be one or more selected from the group consisting of carbon monoxide, methane, ethane, ethylene, ethanol, acetylene, propane, propylene, butane, butadiene, pentane, pentene, cyclopentadiene, hexane, cyclohexane, benzene, and toluene.

In the preparation method of the present invention, a removal process for removing metal catalyst-derived metal impurities remaining in the carbon nanotube composition may be optionally performed. In this regard, the metal impurities removal process may be performed according to a general method such as washing, acid treatment, or the like.

EXAMPLES

Hereinafter, embodiments of the present invention will be described in detail in such a way that the invention may be carried out without undue difficulty by one of ordinary skill in the art to which the present invention pertains. However, the present invention may be embodied in many different forms and the following examples are not intended to limit the scope of the present invention.

<Preparation of Carbon Nanotube Composition>

Example 1

Aluminum hydroxide ($Al(OH)_3$) as an aluminum-based support precursor was subjected to first heat treatment in an air atmosphere at 450° C. for 4 hours, thereby preparing an aluminum-based support including 40 wt % or more of AlO(OH).

Separately, citric acid and $NH_4VO_3$ were added into water in a molar ratio of 1:0.09 and dissolved to prepare an aqueous $NH_4VO_3$ solution. $Co(NO_3)_2 \cdot 6H_2O$ and the aqueous $NH_4VO_3$ solution were mixed such that a molar ratio of Co to V was 10:1, thereby preparing an aqueous catalyst precursor solution, which is a clear aqueous solution.

The support and the aqueous catalyst precursor solution were mixed such that the respective amounts of Co and V in the aqueous catalyst precursor solution were 23 moles and 2.3 moles with respect to 100 moles of Al in the support.

The aqueous catalyst precursor solution was supported on the support in a 60° C. thermostatic bath for 5 minutes, and then dried in an air atmosphere at 120° C. for 12 hours. Subsequently, the resulting support was subjected to second heat treatment in an air atmosphere at 720° C. for 4 hours, thereby preparing a supported catalyst.

2 g of the supported catalyst was placed in a lower end portion of a quartz tube having an inner diameter of 55 mm located in a fixed bed reactor. The inside of the fixed bed reactor was heated to 670° C. in a nitrogen atmosphere and maintained, followed by synthesis for 100 minutes while flowing a mixture of nitrogen and ethylene gas in a volume ratio of 3:1 at a rate of 3.2 f/min, thereby obtaining a carbon nanotube composition.

Example 2

A carbon nanotube composition was prepared in the same manner as in Example 1, except that citric acid and $NH_4VO_3$ were added to water in a molar ratio of 1:0.096 and dissolved to prepare an aqueous $NH_4VO_3$ solution.

Example 3

A carbon nanotube composition was prepared in the same manner as in Example 1, except that citric acid and $NH_4VO_3$ were added to water in a molar ratio of 1:0.115 and dissolved to prepare an aqueous $NH_4VO_3$ solution.

Example 4

A carbon nanotube composition was prepared in the same manner as in Example 1, except that citric acid and $NH_4VO_3$ were added to water in a molar ratio of 1:0.144 and dissolved to prepare an aqueous $NH_4VO_3$ solution.

Example 5

Aluminum hydroxide ($Al(OH)_3$) as an aluminum-based support precursor was subjected to first heat treatment in an air atmosphere at 450° C. for 4 hours, thereby preparing an aluminum-based support including 40 wt % or more of AlO(OH).

Separately, citric acid and $NH_4VO_3$ were added to water in a molar ratio of 1:0.58 and dissolved to prepare an aqueous $NH_4VO_3$ solution. $Co(NO_3)_2 \cdot 6H_2O$ and the aqueous $NH_4VO_3$ solution were mixed such that a molar ratio of Co to V was 10:1, thereby preparing an aqueous catalyst precursor solution, which is a clear aqueous solution.

The support and the aqueous catalyst precursor solution were mixed such that the amounts of Co and V in the aqueous catalyst precursor solution were respectively 16 moles and 1.6 moles with respect to 100 moles of Al in the support.

The aqueous catalyst precursor solution was supported on the support in a 60° C. thermostatic bath for 5 minutes, and then dried in an air atmosphere at 120° C. for 12 hours. Subsequently, the resulting support was subjected to second heat treatment in an air atmosphere at 720° C. and 1.0 bar for 4 hours, thereby preparing a supported catalyst.

A pressure applied during the second heat treatment means an internal pressure in the second heat treatment container. When the internal pressure was increased to more than the above-described pressure, a lid of the second heat treatment container was partially opened by the internal pressure and a gas in the container was discharged to the outside, and when the internal pressure of the second heat treatment container returned to the above-described range after gas discharge, the lid of the container was closed again. The second heat treatment process was performed while these processes were repeated for 4 hours. 2 g of the supported catalyst was placed in a lower end portion of a quartz tube having an inner diameter of 55 mm located in a fixed bed reactor. The inside of the fixed bed reactor was heated to 670° C. in a nitrogen atmosphere and maintained, followed by synthesis for 100 minutes while flowing a mixture of nitrogen and ethylene gas in a volume ratio of 3:1 at a rate of 3.2 f/min, thereby obtaining a carbon nanotube composition.

Example 6

A carbon nanotube composition was prepared in the same manner as in Example 1, except that citric acid and $NH_4VO_3$ were added to water in a molar ratio of 1:0.6 and dissolved to prepare an aqueous $NH_4VO_3$ solution.

Comparative Example 1

A carbon nanotube composition was prepared in the same manner as in Example 1, except that citric acid and $NH_4VO_3$ were added to water in a molar ratio of 1:0.085 and dissolved to prepare an aqueous $NH_4VO_3$ solution.

Comparative Example 2

A carbon nanotube composition was prepared in the same manner as in Example 1, except that citric acid and $NH_4VO_3$ were added to water in a molar ratio of 1:0.61 and dissolved to prepare an aqueous $NH_4VO_3$ solution.

Comparative Example 3

A carbon nanotube composition was prepared in the same manner as in Example 1, except that citric acid and $NH_4VO_3$ were added to water in a molar ratio of 1:2.3 and dissolved to prepare an aqueous $NH_4VO_3$ solution, and the support and the aqueous catalyst precursor solution were mixed such that amounts of Co and V in the aqueous catalyst precursor solution were respectively 14 moles and 1.4 moles with respect to 100 moles of Al in the support.

Comparative Example 4

A carbon nanotube composition was prepared in the same manner as in Comparative Example 1, except that aluminum hydroxide ($Al(OH)_3$) as an aluminum-based support precursor was subjected to first heat treatment in an air atmosphere at 800° C. for 4 hours.

Experimental Example 1

Physical properties of the carbon nanotube compositions of the examples and the comparative examples were evaluated using the following methods, and the results thereof are shown in Tables 1 and 2 below.

(1) Production yield: {(total weight of prepared carbon nanotube composition)−(total weight of supported catalyst used)}/(total weight of supported catalyst used)

(2) BET specific surface area: BET specific surface area was calculated from the amount of nitrogen gas adsorbed at a liquid nitrogen temperature (77 K) using BELSORP-mino II manufactured by BEL Japan.

(3) Bulk density: A 32 ml stainless container (Manufacturer: SCOTT), a weight of which was known, was filled with carbon nanotube composition powder, the stainless container was weighed, and then bulk density was calculated according to Equation below.

Bulk density (kg/m3)=weight (kg) of carbon nanotubes/volume (m3) of carbon nanotubes (4) Powder resistance (ohm·cm A 1 g/cc): An insulting mold was filled with carbon nanotubes so as to have a density of 1 g/cc, a pressure was applied thereto, surface current and voltage were measured using 4 probes through Loresta-GX (Product Name, manufacturer: MITSUBISHI CHEMICAL ANALYTECH), and a powder resistance was calculated therefrom.

(5) Maximum dispersion concentration (wt %): A conductive material dispersion was prepared by adding a carbon nanotube composition to N-methylpyrrolidone little by little. Then, a maximum dispersion concentration of the carbon nanotube composition that could be included in the conductive material dispersion was measured, and the results thereof are shown in Tables 1 and 2 below.

TABLE 1

| Classification | Example 1 | Example 2 | Example 3 | Example 4 | Example 5 | Example 6 |
| --- | --- | --- | --- | --- | --- | --- |
| Molar ratio of citric acid to $NH_4VO_3$ | 1:0.09 | 1:0.096 | 1:0.115 | 1:0.144 | 1:0.58 | 1:0.6 |
| Molar ratio of Co to V | 10:1 | 10:1 | 10:1 | 10:1 | 10:1 | 10:1 |
| Molar ratio of Al to Co to V | 100:23:2.3 | 100:23:2.3 | 100:23:2.3 | 100:23:2.3 | 100:16:1.6 | 100:23:2.3 |
| First heat treatment temperature (° C.) | 450 | 450 | 450 | 450 | 450 | 450 |
| Second heat treatment pressure (bar) | Atmospheric pressure | Atmospheric pressure | Atmospheric pressure | Atmospheric pressure | 1 bar | Atmospheric pressure |

TABLE 1-continued

| Classification | Example 1 | Example 2 | Example 3 | Example 4 | Example 5 | Example 6 |
|---|---|---|---|---|---|---|
| Secondary structural form | Carbon nanotube composition | Carbon nanotube composition | Carbon nanotube composition | Carbon nanotube composition | Carbon nanotube composition | Carbon nanotube composition |
| Production yield (- fold) | 19 | 14 | 21.8 | 7 | 20 | 25 |
| Specific surface area ($m^2/g$) | 200 | 225 | 201 | 232 | 206 | 238 |
| Bulk density ($kg/m^3$) | 110 | 95.4 | 121 | 54.3 | 41.8 | 49 |
| Specific surface area/bulk density | 1.81 | 2.36 | 1.66 | 4.27 | 4.93 | 5 |
| Powder resistance (ohm · cm @ 1 g/cc) | 0.0170 | 0.0171 | 0.0153 | 0.0128 | 0.0171 | 0.0115 |
| Maximum dispersion concentration (wt %) | 3.5 | 3.5 | 3.5 | 3.5 | 2.5 | 2.5 |

TABLE 2

| Classification | Comparative Example 1 | Comparative Example 2 | Comparative Example 3 | Comparative Example 4 |
|---|---|---|---|---|
| Molar ratio of citric acid to $NH_4VO_3$ | 1:0.085 | 1:0.61 | 1:2.3 | 1:2.3 |
| Molar ratio of Co to V | 10:1 | 10:1 | 10:1 | 10:1 |
| Molar ratio of Al to Co to V | 100:23:2.3 | 100:23:2.3 | 100:14:1.4 | 100:14:1.4 |
| First heat treatment temperature (° C.) | 450 | 450 | 450 | 800 |
| Second heat treatment pressure (bar) | Atmospheric pressure | Atmospheric pressure | Atmospheric pressure | Atmospheric pressure |
| Secondary structural form | Carbon nanotube composition | Carbon nanotube composition | Bundle-type carbon nanotubes | Bundle-type carbon nanotubes |
| Production yield (- fold) | 19 | 5 | 24 | 22.8 |
| Specific surface area ($m^2/g$) | 185 | 240 | 250 | 190 |
| Bulk density ($kg/m^3$) | 100 | 43 | 26.4 | 18.1 |
| Specific surface area/bulk density | 1.85 | 5.58 | 9.47 | 10.5 |
| Powder resistance (ohm-cm @ 1 g/cc) | 0.02 | 0.012 | 0.0088 | 0.009 |
| Maximum dispersion concentration (wt %) | 3.5 | 1.5 | 1.25 | 1.25 |

Referring to Tables 1 and 2, it was confirmed that the cases of Examples 1 to 6 prepared by adding citric acid and $NH_4VO_3$ in a molar ratio of 1:0.09 to 1:0.6 had a specific surface area of 200 $m^2/g$ to 238 $m^2/g$ and a ratio of specific surface area to bulk density of 1.61 to 5, and thus were suitable for use as a conductive material dispersion due to their low powder resistances and high maximum dispersion concentrations.

However, it was confirmed that the case of Comparative Example 1 prepared by adding citric acid and $NH_4VO_3$ in a molar ratio of 1:0.085 had a ratio of specific surface area to bulk density of 1.85, while having a specific surface area of 185 $m^2/g$, and thus was not suitable for use as a conductive material dispersion due to its high powder resistance.

It was also confirmed that the case of Comparative Example 2 prepared by adding citric acid and $NH_4VO_3$ in a molar ratio of 1:0.61 had a ratio of specific surface area to bulk density of 5.58, and thus although it exhibited excellent conductivity due to a low powder resistance, it was not suitable for use as a conductive material dispersion due to its excessively low maximum dispersion concentration.

It was also confirmed that the cases of Comparative Examples 3 and 4 prepared by adding citric acid and $NH_4VO_3$ in a molar ratio of 1:2.3 were bundle-type carbon nanotubes and respectively had ratios of specific surface area to bulk density of 9.47 and 10.5, and thus although they exhibited excellent conductivity due to their low powder resistances, they were not suitable for use as conductive material dispersions due to their excessively low maximum dispersion concentrations.

The invention claimed is:

1. A carbon nanotube composition comprising a plurality of carbon nanotube units in the form of entangled-type carbon nanotubes and bundle-type carbon nanotubes,
    wherein the carbon nanotube composition has a specific surface area of 190 $m^2/g$ to 240 $m^2/g$ and satisfies the following Equation 1:

$$0.1 \leq X/Y \leq 5.29 \quad \text{<Equation 1>}$$

wherein, in Equation 1, X is a number representing a specific surface area of the carbon nanotube composition, and
Y is a number representing a bulk density of the carbon nanotube composition, wherein a unit of the specific surface area is $m^2/g$, and a unit of the bulk density is $kg/m^3$,
wherein the carbon nanotube units having an average diameter of 10 nm to 30 nm, and
wherein the carbon nanotube units have an interlayer distance ($d_{002}$) of a carbon crystal of 0.335 nm to 0.342 nm, wherein the interlayer distance is obtained by X-ray diffraction, the carbon nanotube units satisfy the following condition: interlayer distance ($d_{002}$)<0.3448-0.0028 (log $\varphi$) wherein $\varphi$ is an average diameter of the carbon nanotube units, and the carbon nanotube units have a thickness (Lc) in a C-axis direction of the crystal of 40 nm or less.

2. The carbon nanotube composition of claim 1, wherein the specific surface area of the carbon nanotube composition is 193 $m^2/g$ to 239 $m^2/g$.

3. The carbon nanotube composition of claim 1, wherein the specific surface area of the carbon nanotube composition is 195 $m^2/g$ to 239 $m^2/g$.

4. The carbon nanotube composition of claim 1, wherein, the value of Equation 1 is 1 to 5.14.

5. The carbon nanotube composition of claim 1, wherein the bulk density of the carbon nanotube composition is 25 kg/m$^3$ to 150 kg/m$^3$.

6. The carbon nanotube composition of claim 1, wherein the bulk density of the carbon nanotube composition is 35 kg/m$^3$ to 130 kg/m$^3$.

\* \* \* \* \*